Figure 2:
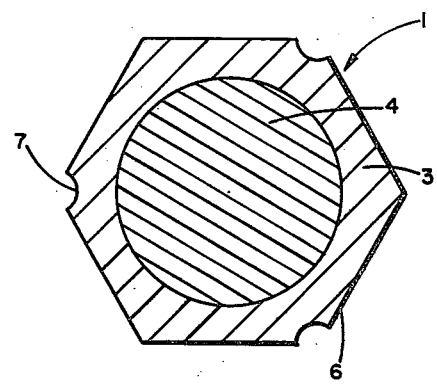

March 12, 1963 R. BALENT 3,081,247
MODERATOR ELEMENTS FOR UNIFORM POWER NUCLEAR REACTOR
Filed March 10, 1959 2 Sheets-Sheet 1

INVENTOR.
RALPH BALENT
BY
*Gerald A. Koris*
ATTORNEY

March 12, 1963  R. BALENT  3,081,247
MODERATOR ELEMENTS FOR UNIFORM POWER NUCLEAR REACTOR
Filed March 10, 1959  2 Sheets-Sheet 2

INVENTOR.
RALPH BALENT
BY
Gerald A. Koris
ATTORNEY

3,081,247
MODERATOR ELEMENTS FOR UNIFORM POWER NUCLEAR REACTOR

Ralph Balent, Tarzana, Calif., assignor, by mesne assignments, to the United States of America as represented by the United States Atomic Energy Commission
Filed Mar. 10, 1959, Ser. No. 798,521
5 Claims. (Cl. 204—193.2)

My invention relates to an improved moderator composition for a nuclear reactor, and more particularly to a moderator composition for achieving flatter flux and more uniform power generation across the core of a nuclear reactor.

In present nuclear reactors, the neutron flux pattern across the core is not uniform. The flux generally dips radially and axially from the center of the core, and the ratio of peak to average flux can vary considerably; for example, 2–3:1. As a result of non-uniform flux, the heat generation rate varies over the core, and the power level must necessarily be limited by the maximum permissible temperature of the hottest fuel elements rather than of the average. Thus, power obtainable from a reactor of a given core size or fuel load is correspondingly reduced over what would be potentially obtainable with uniform unit power production.

Not only does poor peak-to-average flux distribution limit reactor power, but it also limits fuel element burnup before reprocessing. Here, as in power generation, burnup of the entire element is set by that portion of the element which first reaches the maximum for the particular fuel. If maximum burnup is exceeded, fuel element rupture or other undesirable consequences could occur. More frequent reprocessing increases the fuel cycle portion of the total cost of nuclear power generation.

The net result of non-uniform flux is increased capital and fuel costs, and hence higher total cost for generating nuclear power. One potential area for greatly improving nuclear power costs lies in leveling the flux or power level across the reactor core so that each unit of the core can produce power at a uniform rate.

Suggestions have been offered heretofore for improving reactor flux patterns. These have involved changing the radial lattice spacing of fuel elements, changing the fuel enrichment for different radial positions, and programming fuel element position. In changing the lattice spacing, engineering problems arise such as obtaining correct flow distribution and, if the moderator is solid, in manufacturing various types and sizes of moderator pieces. In changing the fuel enrichment, increased costs result and the power generation rate is changed since power per assembly is proportional to the product of the flux times fuel. Furthermore, such flux-flattening methods have affected only radial flux, and have not improved axial flux distribution. Programming of fuel elements; that is, periodically changing fuel element positions in the core, is of no benefit with regard to axial flux compensation, and creates difficult handling problems, requiring the reactor to be taken off-stream during relocation.

An object of my present invention, therefore, is to provide a nuclear reactor with improved core performance characteristics.

Another object is to provide a reactor core with more uniform power distribution across the core, both radially and axially.

Another object is to provide an improved composite moderator for a nuclear reactor.

Still another object is to provide such a composition wherein substantially uniform power is generated across the core with fuel elements in an equal lattice spacing.

Figure 3:
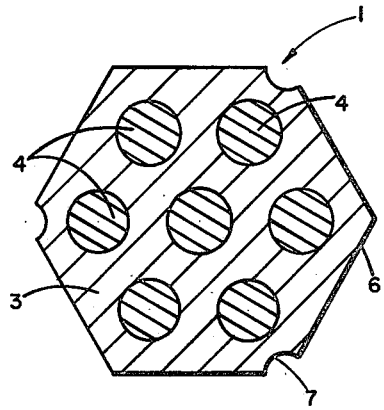
Figure 1:
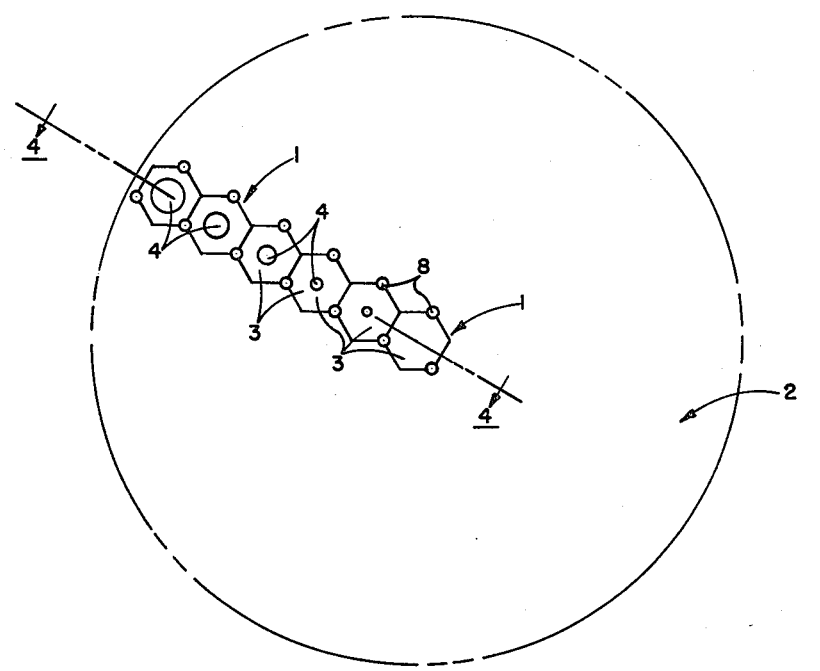
Figure 4:
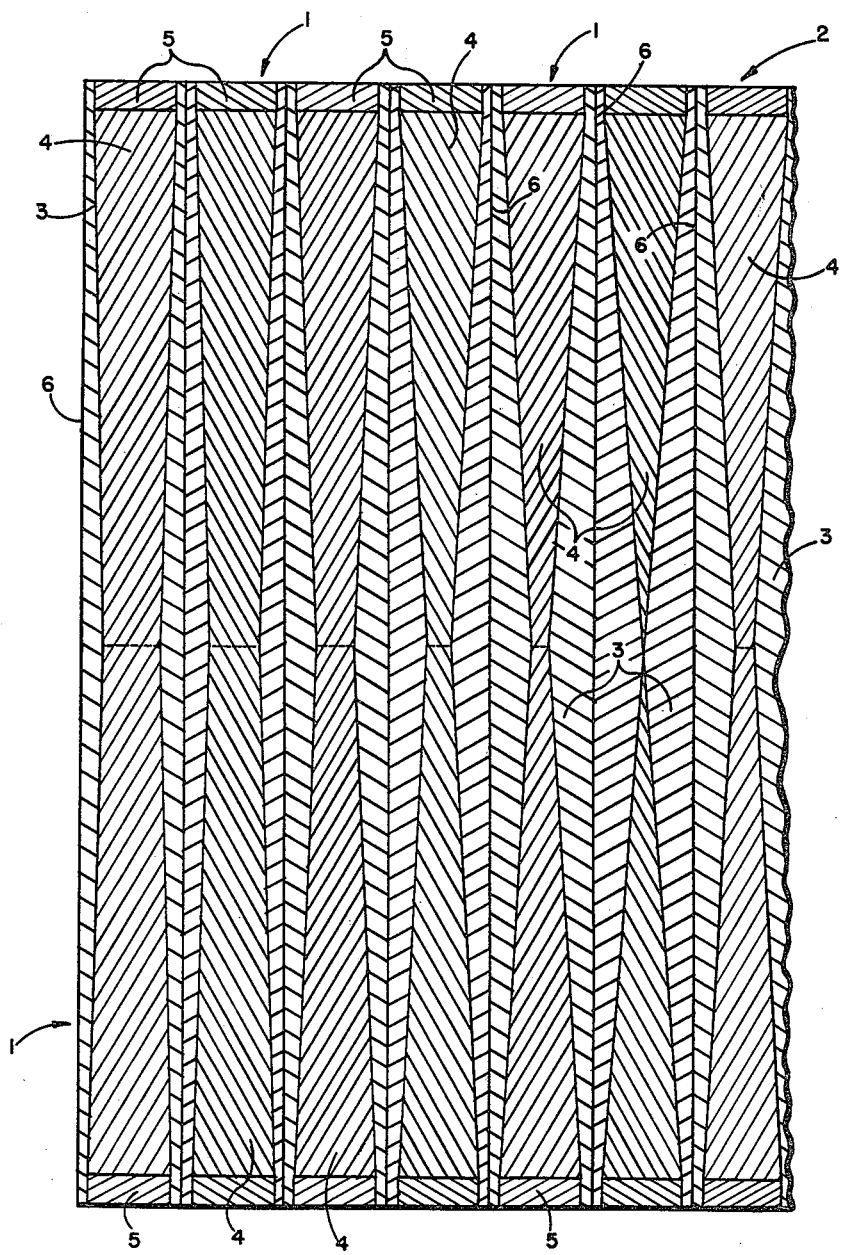

The above and other objects and advantages of my invention will become apparent from the following detailed description taken together with the appended claims and the accompanying drawings. FIGURE 1 is a schematic cross section of a reactor core showing distribution of my moderator elements; FIGURE 2 is a horizontal sectional view of one version of my moderator element; FIGURE 3 is a section of an alternate embodiment, and FIGURE 4 is a vertical section through a diameter of the core of FIGURE 1.

In my invention uniform power is achieved by using moderator elements which are a mixture of two elements. One moderator composition has a lower Fermi age, and hence greater moderating ability, than the other element. The composite elements have an increasing amount of the material of the better moderating ability as a function of radial and/or axial distance from the reactor core center. The outer elements predominate in, or totally comprise, the material of the better moderating ability, and the inner elements predominate in, or totally comprise, the material of the poorer moderating capacity. Similarly, the ends of the fuel element have varying amounts of the better moderator in order to flatten axial flux.

The present design results in all fuel elements operating at closely similar flux levels, both radially and axially. The fuel elements all reach maximum temperature limits, thereby attaining a higher thermal rating for a given core size. Uniform burnup of fuel elements is achieved; need for orificing individual fuel elements is eliminated, and neutron economy is improved.

Among the illustrative, but not non-limiting, examples of the mixed moderators which may be employed in the described manner are beryllium or beryllium oxide with graphite, hydrogen-deuterium mixtures, graphite-deuterium mixtures, and graphite-hydrogen mixtures. The hydrogen and deuterium isotopes in the foregoing mixtures may be present in water, hydrocarbons such as polyphenyls (e.g., diphenyl, terphenyl), and metal hydrides of metals with relatively low thermal neutron absorption cross section such as zirconium hydride, titanium hydride and yttrium hydride. In each foregoing case the better moderator, i.e., of lower atomic weight and lower Fermi age ($H>D>Be>C$), would increase in concentration with increasing radial and axial distance from the center of the core.

The manner in which flux normally varies axially and radially with a single moderator in an unreflected core is shown in Glasstone, "Principles of Nuclear Engineering," page 173, figure 3.12. It is noted for a cylindrical core that the axial variation (cosine function) and the radial variation ($J_0$ Bessel function) are very similar, and for practical purposes may be considered the same, as a cosine curve. The moderators in the present invention are mixed to flatten these curves. Specifically, the mixture for the two different moderators would be such that the resulting Fermi age from the mixture follows the same function as the thermal neutron flux in a uniformly loaded single moderated reactor, as shown in the above curve. The better moderator would be represented by the abscissa reading and the poorer moderator by the ordinate reading. The unity value on each axis would represent the Fermi age of each substance (e.g., 387 cm.$^2$ for graphite and 105 cm.$^2$ for BeO). The age at any point on the curve would then be the arithmetic mean of the two Fermi ages, and hence the volumetric mixture of the two moderator components at any given point would be such as to give that particular age. Ideally, the moderator concentration would continuously vary to follow the curve. Practically, however, the curve can be satisfactorily approximated by a plurality of regions in a step-wise gradation. For example, approximately 3–6 regions, each region being of the same moderator composition, would be very satisfactory. While more than six regions can be used, the successively smaller increment of improvement might not warrant the additional trouble and expense.

For clarity in presentation, the following discussion and illustration of the invention will be with reference to a beryllium oxide-graphite mixture. (Beryllium metal is equally suitable but considerably more expensive, and where the metal form is not required for strength, the ceramic can be used.) Such a moderator mixture can be used with fuel elements of different compositions and configurations and with different coolant media of relatively low thermal neutron absorption cross-section such as water, gas (helium, $CO_2$, $N_2$), molten metals, such as sodium, and hydrocarbons such as polyphenyls. Sodium will be used as the reference coolant in the discussion below in view of its low vapor pressure, excellent heat transfer characteristics, and the existing technology and experience with sodium cooled reactors.

Referring now to FIGURE 1, the element 1 in the center of the core 2 is comprised of graphite 3. Then the elements have increasing amounts of BeO 4 in the center thereof as a function of radial distance from the reactor center, with the outer elements predominating in BeO, as seen in both FIGURES 1 and 4. In this example, the diameter of each hexagonal moderator unit is 16.75", and the successive diameters of the beryllia plugs are 0, 2, 5, 8, 11, and 14 inches. A core of this size would be about 12.5' x 12.5' and rated for 75 mwe.

There are a number of ways in which the mixture of BeO and graphite can be assembled and no particular way is critical. Two such ways are shown in FIGURES 2 and 3. In FIGURE 2 a central, axial hole of varying diameter is bored in the hexagonal graphite logs 3 and a BeO 4 cylinder is stacked in the bored-out volume. In FIGURE 3 is shown a number of uniform small-diameter holes the full length of each graphite hexagon filled with BeO slugs 4. The longitudinal end of each moderator element could be closed with a graphite plug 5, as shown in FIGURE 4. Beryllia and graphite are chemically compatible and the fabrication and arrangement in the shapes of FIGURES 2 and 3 present no problems. The graphite can be machined into the desired shape and BeO powder hot pressed or sintered into the desired sized cylinders for insert in the graphite. Hot pressing of BeO in graphite molds is a known method of improving the plasticity of BeO, which indicates the compatibility of the materials.

The moderator element may be clad or canned with a metal 6 to protect the graphite and beryllia from the effects of sodium. Hexagonal graphite elements have heretofore been clad with zirconium or stainless steel for protection from sodium in sodium graphite reactors. (See the papers of W. E. Parkins, "The Sodium Reactor Experiment" (SRE) in the "Proceedings of the Conference on the Peaceful Uses of Atomic Energy," August 1955; and the book by C. Starr et al., "Sodium Graphite Reactors," given at the second Geneva conference in 1958.) If a water, gaseous, or hydrocarbon coolant is used, other cladding materials such as aluminum and magnesium and their alloys could also be satisfactorily employed. Three adjacent scallops 7 in the periphery of the moderator element would define a process channel 8 (FIGURE 1) in which the fuel element is positioned. Alternately, the fuel element could be positioned in a central process channel passing axially through the moderator element as in the SRE. The hexagonal canned moderator element has been illustrated because of familiarity from previous use in the SRE, and the efficient stacking obtainable with hexagonal shapes. However, other obvious moderator shapes may be chosen, such as circular, triangular, rectangular and octagonal elements. The fuel element itself may be of any composition and configuration; it is not critical and is not part of my invention. For example, the fuel element may comprise a cluster of uranium metal or alloy (e.g., U—Mo) rods, as in the SRE, a cluster of rods containing uranium dioxide, uranium carbide, or other ceramic composition. A hollow concentric fuel element may be used or a plate-type element, just to mention a few.

The following examples are offered to illustrate my invention.

EXAMPLE I

The first case was a simple one, designed to verify the validity of the concept. Numerical flux and criticality calculations were performed on a one-dimensional model of a sodium graphite reactor with a two-region core and reflector. Only radial flux was considered. The reference sodium graphite reactor had the following principal characteristics:

| | |
|---|---|
| Core diameter and height_____feet__ | 12.5 |
| Moderator can size_____inches__ | 16.75 |
| Fuel cluster_____rods__ | 61 |
| Rod diameter_____inches__ | 0.34 |
| Fuel enrichment_____a/o__ | 3.5 |
| Radial average-to-maximum power_____ | 0.574 |
| Axial average-to-maximum power (no control rod effect)_____ | 0.715 |
| Radial reflector thickness_____feet__ | 1.5 |
| Axial reflector thickness_____do___ | 2.0 |

The relevant lattice properties of the central core region were those calculated by standard techniques for sodium graphite lattices. The outer region was treated as having the same lattice spacing as a moderator consisting of a 50–50 graphite-beryllia (BeO) volumetric mixture. Its lattice properties were adjusted accordingly.

The results of these calculations are given in terms of average-to-maximum thermal flux, a direct measure of power uniformity in this case.

$R_1$ = Radius of inner core region, graphite moderated
$R_c$ = Radius of outer core region, graphite-BeO moderated (7.5 feet)
$R_r$ = Outer radius of reflector (9.5 feet)

| $R_1/R_c$ | $\bar{\phi}:\phi$ max. |
|---|---|
| 1.0 | 0.583 (single-region, graphite-moderated core). |
| 0.8 | 0.825. |
| 0.7 | 0.866. |
| 0.6 | 0.810. |

The improvement attributable to the inclusion of BeO in the outer region of a graphite-moderated core is clear, with the average-to-peak flux increasing from 0.583 to 0.810.

The significance of this increase is that 50% more power can be removed from the same size core, or a 32% reduction achieved in the number of fuel channels to remove the same amount of power, as compared with a single moderator core. Also, for the same fuel enrichment, a 3.4% increase in reactivity $$\frac{(\Delta k)}{(k)}$$

is obtained. This increase in reactivity could be used to reduce the core size without increasing fuel enrichment.

EXAMPLE II

The reference sodium graphite reactor (75 mwe.), without beryllium, had the following principal features.

Core

| | |
|---|---|
| Height _____feet__ | 12.5 |
| Diameter _____do___ | 12.5 |

Core—Continued

Composition, vol. percent:
- Graphite ............................................. 85.06
- $UO_2$ ............................................... 4.65
- Sodium ............................................... 8.44
- Stainless steel cladding for $UO_2$ ............ 0.79
- Zirconium cladding for graphite ............... 1.06

Reflector

| | Feet |
|---|---|
| Thickness, radial | 1.5 |
| Thickness, axial | 2.0 |

Moderator Cans (Hexagonal With Fuel at Corners)

| | Inches |
|---|---|
| Clad material, stainless steel | 0.017 |
| Distance across flats | 16.75 |

Fuel Element (a Cluster of $UO_2$ Rods)

- Number of rods ............................................. 61
- Rod diameter ...................................inches__ 0.34
- Fuel enrichment ...................................a/o__ 3.5
- Process tube inside diameter ..............inches__ 4.00

Flux and Reactivity Characteristics

- $k_{eff}$ (radial calculation) ............................ 1.0887
- $k_{eff}$ (axial calculation) ............................. 1.0876
- Average-to-peak power (radial) .................. 0.574
- Average-to-peak power (axial) .................... 0.715

For this case of demonstrating the improvements obtained with my invention, both radial flux (with two regions) and axial flux (four regions) were considered.

| Number of core regions | Radial 2 | Axial 4 |
|---|---|---|
| Core Region Outer Boundary, ft.: | | |
| Region 1 | 7.5 | 5.0 |
| Region 2 | 12.5 | 7.5 |
| Region 3 | | 10.0 |
| Region 4 | | 12.5 |
| Volume Percent BeO in Moderator: | | |
| Region 1 | 0 | 0 |
| Region 2 | 40 | 11 |
| Region 3 | | 33 |
| Region 4 | | 99 |
| Volume Percent BeO in Core | 21.7 | 24.2 |
| Weight BeO in Core, lb | 94,100 | |
| Calculated Results: | | |
| $k_{eff}$ | 1.11 | |
| Average-to-peak power | 0.700 | 0.898 |

In both the radial and the axial directions, power is made more uniform as indicated by the increase in average-to-peak power. For the cases shown, this quantity increases $100(0.700-0.574)/0.574 = 22\%$ for the radial case, and $100(.898-.715)/.715 = 23.6\%$ for the axial case.

In presenting the above examples, there is no intent to imply that these cases represent the best results which can be obtained, or that the particular distribution of BeO shown is optimum. Optimum results are obtained when a distribution following the curve in Glasstone, supra, is made. A satisfactory way of approaching the ideal, however, without having a different moderator composition for each position in the core, is to have a finite number of regions, as was mentioned previously. In Example II, this method was advantageously followed.

It is thus apparent that my invention is not limited to any single pair of moderator components, or to any single configuration of the moderator. My invention is inherently broad in its basic conception and should not be limited except as indicated by the appended claims.

I claim:

1. A nuclear reactor core comprising a plurality of fuel elements extending along a longitudinal axis in an equal lattice spacing, said fuel elements being essentially identical, a solid moderator within said core and surrounding said fuel elements, said moderator consisting essentially of two moderating materials, one of said materials having a shorter slowing-down length relative to the other moderating material, the concentration of said one moderating material being lowest at the center of said core and increasing in concentration with distance from the center of said core in a direction parallel with said axis with the highest concentration being adjacent the periphery of said core.

2. The nuclear reactor core of claim 1 wherein said concentration of said one moderating material also increases in concentration with radial distance from the center of the core.

3. The nuclear reactor core of claim 1 wherein said concentration of said one moderating material increases in concentration uniformly with distance from the center of said core in a direction parallel to said axis of said fuel elements.

4. The nuclear reactor core of claim 2 wherein said increase in concentration in a radial direction includes a plurality of incremental steps of varying concentration.

5. A nuclear reactor core comprising a plurality of axially extending fuel elements in an equal lattice spacing, a moderator consisting of a plurality of moderator elements of the same size positioned in said lattice and surrounding said fuel elements, said moderator consisting essentially of two moderating materials, one of said materials having a shorter slowing down length relative to the other moderating material, the concentration of said one moderating material being lowest in the moderator located in the center region of said core and increasing from the center of said core in two directions to the periphery of said core, said increase in the first of said directions being in a plurality of incremental steps between moderator elements normal to said fuel element axes, said increase in the other of said directions being uniform and parallel to said fuel element axes.

References Cited in the file of this patent

UNITED STATES PATENTS

| | | |
|---|---|---|
| 2,774,730 | Young | Dec. 18, 1956 |
| 2,810,689 | Wigner et al. | Oct. 22, 1957 |
| 2,852,456 | Wade | Sept. 16, 1958 |
| 2,890,158 | Ohlinger et al. | June 9, 1959 |

OTHER REFERENCES

Glasstone: "Principles of Nuclear Reactor Engineering," 1955, page 48, Princeton, N.J.

Glasstone: "Principles of Nuclear Reactor Engineering," 1955.

ORNL-2891, An Evaluation of Solid Moderating Materials, April 25, 1960.